UNITED STATES PATENT OFFICE.

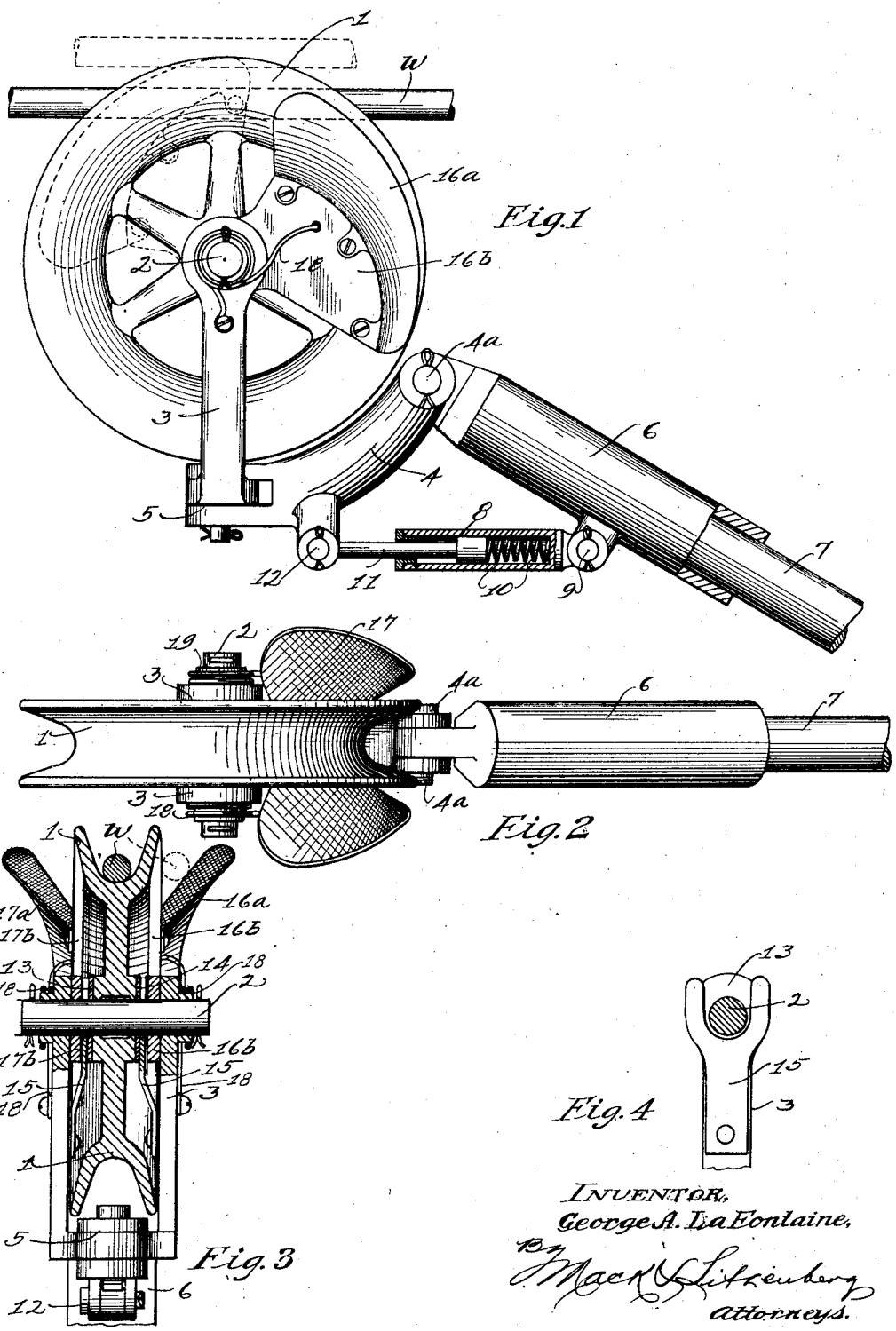

GEORGE A. LAFONTAINE, OF LOS ANGELES, CALIFORNIA.

TROLLEY-RESTORING MECHANISM.

1,391,392. Specification of Letters Patent. Patented Sept. 20, 1921.

Application filed November 7, 1918. Serial No. 262,391.

*To all whom it may concern:*

Be it known that I, GEORGE A. LAFONTAINE, a citizen of the United States, residing in the city of Los Angeles, county of Los Angeles, and State of California, have invented certain new and useful Improvements in Trolley-Restoring Mechanism, of which the following is a specification.

My invention relates to trolley restoring mechanism, and more particularly to mechanism operating in connection with a trolley wheel and adapted to catch on the trolley wire whenever the trolley wheel jumps from the trolley wire and to restore the trolley wheel to the trolley wire, the device being actuated by the trolley wire engaging with said device.

Among the salient objects of my invention are, to provide a device of the character referred to which is simple in its construction and operation and which can be readily adapted to trolley wheels now in use without great expense; to provide in connection with a trolley wheel and its connection to a trolley pole, means for giving a yielding movement of the trolley wheel relative to the pole, thus reducing to a minimum the chance for the trolley wheel becoming disengaged from the trolley wire. Other objects and advantages of my invention will be apparent from the following description of one practical embodiment thereof, taken in connection with the accompanying sheet of drawings, in which Figure 1 is a side elevation of my improved device in action;

Fig. 2 is a top plan view thereof;

Fig. 3 is a vertical sectional view thereof; and

Fig. 4 is a detail view.

Referring now more in detail to the drawings, 1 designates a trolley wheel, mounted on an axle 2, supported in a fork 3, carried by a curved neck 4, pivotally connected to said fork 3, as at 5. Said neck 4, is pivotally connected to a sleeve, 6, adapted to be attached to a trolley pole 7. A cylinder 8, is pivotally connected to said sleeve 6, as at 9, and is provided therein with a spring 10, against which bears a plunger 11, the opposite or outer end of which is pivotally connected to said neck 4, as at 12. This construction and arrangement permits the neck 4 to have a yielding movement downwardly about its pivotal mounting, or connection, at $4^a$, thus giving a yielding relative movement of the trolley wheel. The trolley wheel and its fork 3 also have a turning movement about the pivotal connection at 5, as will be clear from the drawing.

Mounted at opposite sides of the trolley wheel, in the fork 3, and adapted to hold washers 13 and 14 close up against the opposite ends of the trolley wheel hub, are two Y-shaped springs, 15, 15, Fig. 4. By holding said washers 13 and 14 close up against the opposite ends of the hub portion of the trolley wheel, it is possible to retain lubricant in said hub portion.

My restoring mechanism comprises two wing members, designated 16 and 17, mounted at opposite sides of the trolley wheel 1, in the fork 3, said wing members comprising outwardly flaring wings $16^a$ and $17^a$, on the sides of segment portions or members, $16^b$ and $17^b$, pivotally mounted at their inner ends on the shaft 2, and lying up close against the opposite sides of the trolley wheel 1, as shown.

A V-shaped form is thus provided between the sides of the segment members and the wings, the curvature of which is eccentric to the center of the trolley wheel, as will be clear from Fig. 1. Coiled springs, 18 and 19, around the opposite ends of the axle 2, each attached at one end to the fork 3, and at its opposite end to said restoring wing, as at $18^a$, normally hold said wing members in the position relative to the trolley wheel indicated in full lines, Fig. 1. The wing members at the opposite sides of the trolley wheel are thus normally held opposite each other, in the position indicated, and when the trolley pole and wheel jumps from the trolley wire W, one or the other of said wings catches the trolley wire, and as the car moves along the wing thus engaged is turned rearwardly, depressing and restoring the wheel to the wire. To this end the inner surfaces of the wing portions are roughened so as to more surely grip the wire. The wing members, when engaged by the trolley wire, move rearwardly as the car advances, and turn to the position indicated in dotted lines, Fig. 1, thus permitting the trolley wire to be again restored to the groove in the trolley wheel, as will be readily understood from the drawing.

I am aware that changes can be made in my invention as here shown and described without departing from the spirit thereof, and I do not, therefore, limit it to the showing here made, except as I may be limited to the hereto appended claim.

I claim:

In a device of the character described, in combination, a trolley pole and trolley wheel, a yoke pivotally held on said pole and capable of movement about a horizontal axis, a swivel wheel support pivoted to said yoke and having a vertical axis for permitting the turning of said wheel corresponding to a bend in the trolley wire, a cylinder pivotally connected with said pole, a plunger pivotally connected with said yoke and slidable in said cylinder and a spring interposed between the end of said plunger and said cylinder, for holding said wheel in operating position.

Signed at Los Angeles, Los Angeles county, California, this 9th day of October, 1918.

GEORGE A. LAFONTAINE.

In presence of:
W. R. LITZENBERG,
D. O. FAWCETT.